(12) United States Patent
Song et al.

(10) Patent No.: US 9,991,811 B1
(45) Date of Patent: Jun. 5, 2018

(54) CONTROL METHOD AND CONTROL APPARATUS FOR FLYBACK CIRCUIT

(71) Applicant: Delta Electronics (Shanghai) Co., Ltd., Shanghai (CN)

(72) Inventors: Haibin Song, Shanghai (CN); Daofei Xu, Shanghai (CN); Jinfa Zhang, Shanghai (CN); Jian Zhou, Shanghai (CN); Qi Fu, Shanghai (CN); Leyang Yang, Shanghai (CN)

(73) Assignee: DELTA ELECTRONICS (SHANGHAI) CO., LTD., Shanghai (CN)

(*) Notice: Subject to any disclaimer, the term of this patent is extended or adjusted under 35 U.S.C. 154(b) by 0 days. days.

(21) Appl. No.: 15/662,301

(22) Filed: Jul. 28, 2017

(30) Foreign Application Priority Data

Dec. 6, 2016 (CN) .......................... 2016 1 1108738

(51) Int. Cl.
*H02M 3/335* (2006.01)
*H02M 1/08* (2006.01)
*H02M 1/00* (2006.01)

(52) U.S. Cl.
CPC ....... *H02M 3/33592* (2013.01); *H02M 1/083* (2013.01); *H02M 2001/0009* (2013.01)

(58) Field of Classification Search
CPC ............. H02M 3/33592; H02M 1/083; H02M 2001/0009
See application file for complete search history.

(56) References Cited

U.S. PATENT DOCUMENTS

| 6,069,804 A * | 5/2000 | Ingman ................. H02J 7/0068 363/124 |
| 9,899,931 B1 * | 2/2018 | Chang ................ H02M 3/33592 |
| 2014/0003096 A1 * | 1/2014 | Deng ................ H02M 3/33592 363/21.14 |
| 2015/0092457 A1 * | 4/2015 | Braz ................ H02M 3/33584 363/21.12 |

* cited by examiner

*Primary Examiner* — Jue Zhang
(74) *Attorney, Agent, or Firm* — CKC & Partners Co., Ltd.

(57) ABSTRACT

The present invention discloses a control method and a control apparatus for a Flyback circuit. The Flyback circuit includes a primary switch, a secondary rectifier unit, a transformer and an output capacitor. The secondary rectifier unit includes a first terminal and a second terminal, which are electrically connected to the transformer and the output capacitor, respectively. In the control method for a Flyback circuit, after the secondary rectifier unit is controlled to be turned on once or twice according to the input voltage and/or output power of the Flyback, the primary switch is turned on to achieve the zero-voltage-switching. According to the invention, the zero-voltage-switching (ZVS) of the primary switch can be achieved under the entire input voltage range and the entire load range without adding additional power devices.

33 Claims, 6 Drawing Sheets

CONTROL METHOD AND CONTROL APPARATUS FOR FLYBACK CIRCUIT

CROSS-REFERENCE TO RELATED APPLICATIONS

This non-provisional application claims priority under 35 U.S.C. § 119(a) on Patent Application No. 201611108738.5 filed in P.R. China on Dec. 6, 2016, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

TECHNICAL FIELD

The present invention relates to a control method and a control apparatus for a Flyback circuit, and particularly to a control method and a control apparatus for achieving the zero-voltage-switching of the primary switch of a Flyback circuit.

BACKGROUND ART

Quasi-resonant Flyback (QR Flyback) is widely used in low power application. It can achieve zero-voltage-switch (ZVS) of primary switch at low line input condition, but for high line input condition, the turning on loss of primary switch is still considerable despite its valley-switching operation. To achieve higher power density of the switching mode power supply, higher switching frequency is one of the development trend. As frequency rises, switching loss of the primary switch of the Flyback converter rise in direct proportion, which leads to serious efficiency drop, especially at high line input condition. To solve this problem, ZVS Flyback under the entire input voltage range was proposed such as active clamp Flyback.

Although the active clamp Flyback can achieve ZVS of the primary switch, an additional switch is needed, thereby increase cost.

Another more economical solution is also proposed. Please refer to FIGS. 1 and 2. FIG. 1 is a circuit diagram of a QR Flyback in the prior art; and FIG. 2 is a voltage timing diagram of FIG. 1. As shown in FIGS. 1 and 2, a reverse current is generated in a secondary coil through the extended conducting time of a secondary rectifier, and, after turning off the rectifier, the current participates in the resonance of magnetizing inductor $L_m$ and the parasitic capacitor $C_{EQ}$ of the primary switch to achieve ZVS of the primary switch.

To apply the above method, there is a limiting condition: the circuit must operate in a BCM (boundary conduction mode) within the entire input voltage range and the entire load range; if it operates in a DCM (discontinuous conduction mode), that method cannot be adopted. This has a serious impact on the light load efficiency at high line input condition. The reason is as follows: according to the working principle of the BCM of a QR Flyback, in the case of the same load, the higher the input voltage leads to the higher the operating frequency; in the case of the same input voltage, the lighter the load leads to the higher the operating frequency. Therefore, under the condition of high-voltage input and light load, the operating frequency will become very high, and the switching loss will seriously affect the efficiency. In practical applications, in order to enhance efficiency, it is necessary to set the operating frequency of a power supply within a reasonable range. In the case of light load, the operating mode of the circuit will always be switched from the BCM to the DCM; during high-voltage input, even in the case of full load, it may also choose to work in the DCM to enhance efficiency. In this operating mode, the existing method of achieving ZVS of a primary switch by means of the extended conducting time of a secondary rectifier does not apply. Therefore, an optimizing control strategy for the existing topology of QR Flyback is proposed in the present invention.

DISCLOSURE OF THE INVENTION

In order to overcome the above-mentioned problems existing in the prior art, it is an object of the present invention to provide a control method for a Flyback circuit, the Flyback circuit including a primary switch, a secondary rectifier unit, a transformer and an output capacitor, wherein the secondary rectifier unit includes a first terminal and a second terminal, which are electrically connected to the transformer and the output capacitor, respectively, characterized in that, the primary switch is turned on after the secondary rectifier unit is controlled to be turned on once or twice according to the input voltage, or the input voltage and the output power of the Flyback, to achieve zero-voltage-switching of the primary switch.

The present invention further provides a control apparatus for a Flyback circuit, the Flyback circuit including a primary switch, a secondary rectifier unit, a transformer and an output capacitor, wherein the secondary rectifier unit includes a first terminal and a second terminal, which are electrically connected to the transformer and the output capacitor, respectively, characterized in that the control apparatus is electrically connected to the primary switch and the secondary rectifier unit, and, the primary switch is turned on after the secondary rectifier unit is controlled to be turned on once or twice according to the input voltage or output power of the Flyback, to achieve the zero-voltage-switching of the primary switch.

Compared with the prior art, the present invention has all or part of the following technical effects:

The above technical solution disclosed in the present invention aims at solving the problem of the great switching losses of the Flyback. This solution can achieve ZVS of the primary switch under the entire input voltage range and the entire load range without adding additional power devices; moreover, the solution not only achieves ZVS of the primary switch, but also enhances the light load efficiency and reduces the loss caused by the corresponding control strategy.

EMBODIMENTS

The detail contents and technical description of the present invention will be further described with reference to a preferable embodiment, which, however, should not be interpreted as limiting the implementation of the present invention.

The present invention is based on the following principle: before the primary switch is turned on, the secondary rectifier unit is turned on for a second time to generate a reverse current; after turning off the rectifier unit, the current is transferred to the primary coil, and the current participates in the resonance of the magnetizing inductor $L_m$ and the parasitic capacitor $C_{EQ}$ of the primary switch to achieve ZVS of the primary switch.

Further, in the case of low-voltage input ($V_{in} < nV_{out}$), the voltage between the drain and the source of the primary switch can drop to 0V spontaneously, thus achieving ZVS. Only in the case of high-voltage input, the voltage between the drain and the source of the primary switch cannot drop to 0V spontaneously, thus ZVS cannot be achieved. Therefore, in theory, only in the case of high-voltage input, the secondary rectifier unit needs to be turned on for a second time to facilitate ZVS of the primary switch, while in the case of low-voltage input, additional losses will be caused by turning on the secondary rectifier unit for a second time. As such, whether to turn on the secondary rectifier unit for a second time may be determined by judging the level of the input voltage.

The Flyback circuit includes a primary switch, a secondary rectifier unit, a transformer and an output capacitor. The secondary rectifier unit includes a first terminal and a second terminal, which are electrically connected to the transformer and the output capacitor, respectively. After the secondary rectifier unit is controlled to be turned on once or twice according to the input voltage, or input voltage and output power of the Flyback, the primary switch is turned on to achieve ZVS. The transformer includes a magnetizing inductor, and the secondary rectifier unit includes a synchronous rectifier. During the second conducting time of the secondary rectifier unit, when a reverse current flowing through the synchronous rectifier from the drain to the source reaches a given value, the synchronous rectifier is switched off, and the magnetizing inductor and the parasitic capacitor of the primary switch resonate to achieve ZVS of the primary switch.

Figure 1:
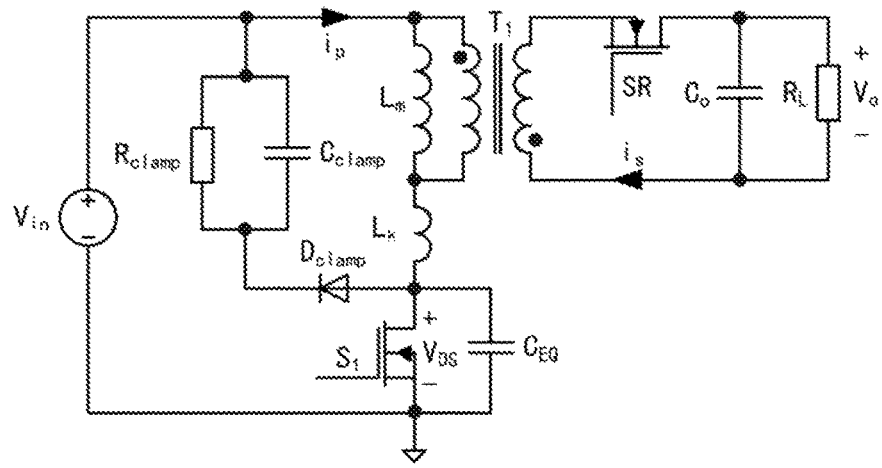
FIG. 1 is a circuit diagram of a QR Flyback circuit in the prior art.
Figure 2:
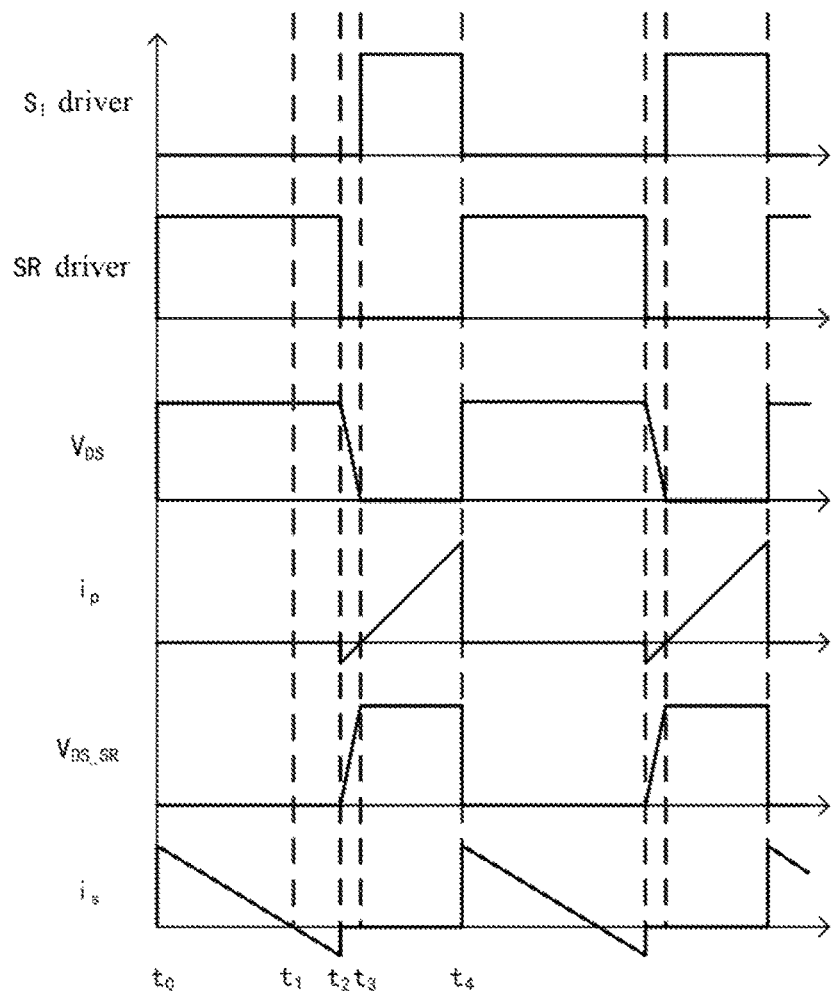
FIG. 2 is a voltage diagram of the Flyback in FIG. 1.
Figure 3A:
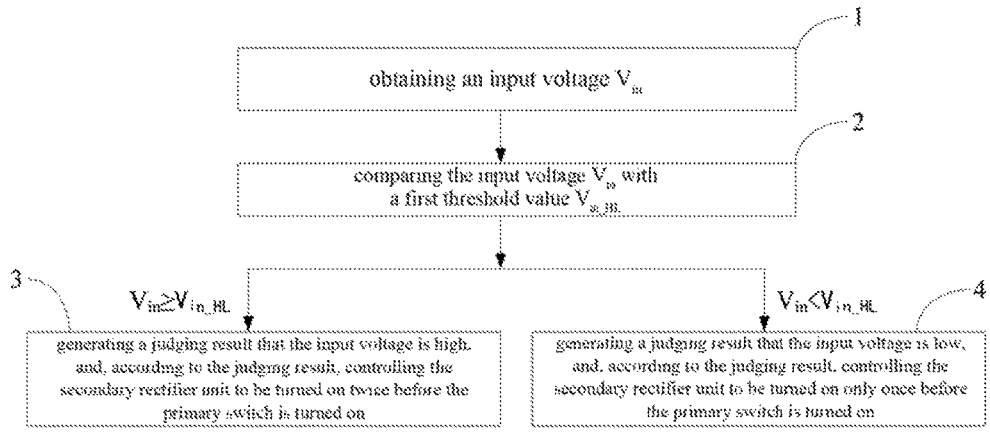
FIG. 3A is a flow diagram of a control method for a Flyback circuit according to the present invention.

The control method for a Flyback circuit of the present invention is further described as below with reference to the accompanying drawings. Please refer to FIG. 3A, which is a flow diagram of a control method for a Flyback circuit according to the present invention. As shown in FIG. 3A, the control method for a Flyback circuit of the present invention comprises the steps of:

Step 1: obtaining the input voltage of the Flyback circuit;

Step 2: comparing the input voltage with a first threshold value $V_{in\_HL}$;

Step 3: when the input voltage is greater than or equal to the first threshold value $V_{in\_HL}$, generating a judging result that the input voltage is high, and, according to the judging result, controlling the secondary rectifier unit to be turned on twice before the primary switch is turned on; and Step 4: when the input voltage is smaller than the first threshold value $V_{in\_HL}$, the control apparatus generating a judging result that the input voltage is low, and, according to the judging result, controlling the secondary rectifier unit to be turned on only once before the primary switch is turned on, wherein the first threshold value $V_{in\_HL} \geq nV_{out}$, $V_{out}$ is the output voltage of the Flyback circuit, and n is the turns ratio of the transformer of the Flyback circuit.

Step 3 further comprises detecting an interelectrode voltage $V_{DS\_SL}$ between the drain and the source of the primary switch, and turning on the primary switch when the interelectrode voltage $V_{DS\_SL}$ is smaller than a third threshold value $V_{DS\_ZVS}$, wherein the third threshold value $V_{DS\_ZVS}$ is set to be smaller than ($V_{in} - nV_{out}$), wherein $V_{in}$ is the input voltage of the Flyback circuit, n is the turns ratio of the transformer of the Flyback circuit, and $V_{out}$ is the output voltage of the Flyback circuit.

Step 4 further comprises detecting the interelectrode voltage $V_{DS\_SL}$ between the drain and the source of the primary switch, and turning on the primary switch when the waveform of the interelectrode voltage $V_{DS\_SL}$ reaches the valley.

In this embodiment, the secondary rectifier unit includes a synchronous rectifier SR. In Step 1, an interelectrode voltage $V_{DS\_SR\_1}$ between the source (the first terminal) and the drain (the second terminal) of the synchronous rectifier during the conducting time of the primary switch is detected to obtain the input voltage, wherein $V_{in} = n(V_{DS\_SR\_1} - V_{out})$, n is the turns ratio of the transformer of the Flyback circuit, and $V_{out}$ is the output voltage of the Flyback circuit. However, the present invention is not limited to this. In another embodiment, the input voltage is obtained in Step 1 by detecting the input voltage on the primary side.

Furthermore, Step 3 comprises determining whether the instantaneous value of a waveform of the interelectrode voltage $V_{DS\_SR}$ between the source (the first terminal) and the drain (the second terminal) of the synchronous rectifier reaches the valley, and turning on the synchronous rectifier for a second time when the instantaneous value reaches the valley. When the interelectrode voltage $V_{DS\_SR}$ between the source (the first terminal) and the drain (the second terminal) of the synchronous rectifier reaches the $m^{th}$ valley of the waveform, the secondary controller turns on the synchronous rectifier for a second time, wherein the value of m is determined according to the load of the Flyback circuit, and m is a positive integer, and wherein the larger the load, the smaller the value of m. In this embodiment, it is also possible to determine the magnitude of the load of the Flyback circuit based on the magnitude of the current, wherein the current is that flowing through the synchronous rectifier or the primary switch.

It is noteworthy that, in Step 3, a reference current $I_{ref}$ may also be formed in accordance with the input voltage of the Flyback circuit, and the current peak value during the second conducting time of the synchronous rectifier is controlled according to the reference current $I_{ref}$ so as to control the second conducting time of the synchronous rectifier. The current during the second conduction can be calculated by detecting the drain-source voltage of the synchronous rectifier according to the conducting resistance thereof, or through the secondary series resistors.

Furthermore, the secondary rectifier unit includes a synchronous rectifier and a switch unit connected in parallel with the synchronous rectifier SR. When it is necessary to turn on the secondary rectifier unit for a second time, only the switch unit is turned on but the synchronous rectifier not. In another embodiment, the secondary rectifier unit includes a diode and a switch unit connected in parallel with the diode, wherein the switch unit is a transistor, but the invention is not limited to this.

Figure 3B:
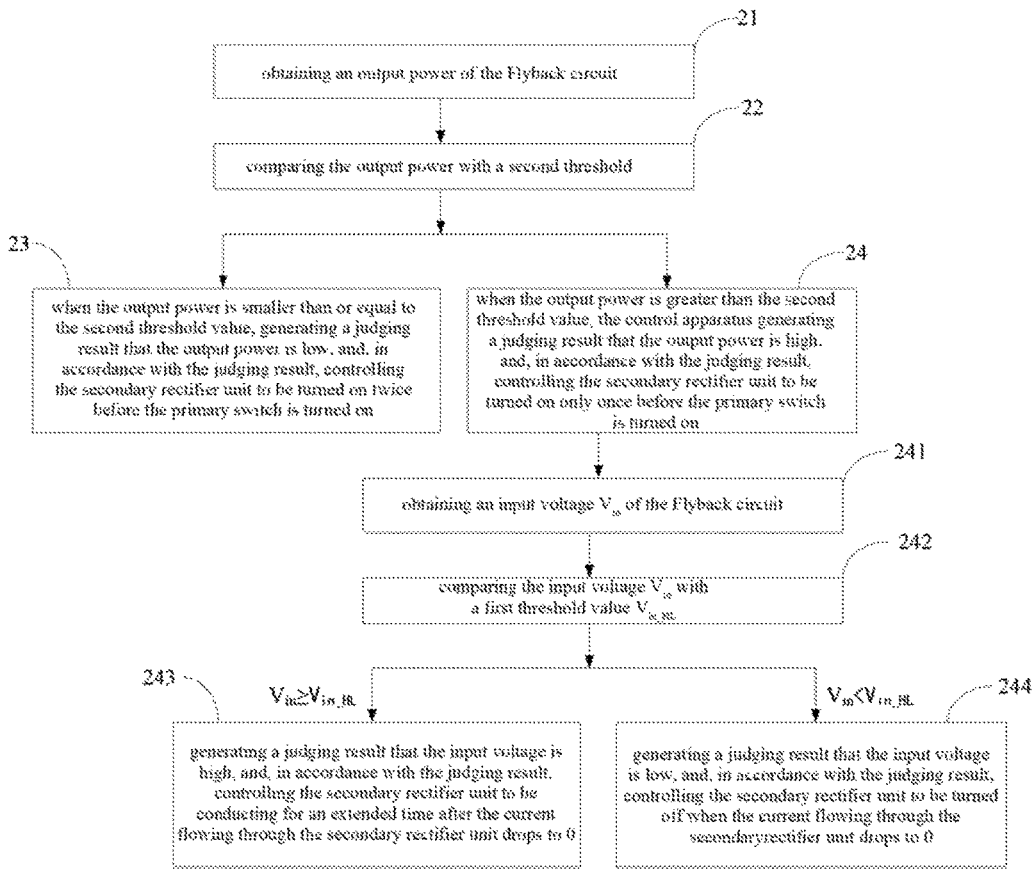
FIG. 3B is a flow diagram of another embodiment of a control method for a Flyback circuit according to the present invention.

Please refer to FIG. 3B, which is a flow diagram of another embodiment of a control method for a Flyback circuit according to the present invention. As shown in FIG. 3B, the control method for a Flyback circuit of the present invention comprises the steps of:

Step 21: obtaining the output power of the Flyback circuit, wherein in this step the output power can be obtained by detecting the current flowing through the primary switch, or by detecting the current flowing through the secondary rectifier unit, or by detecting the output current of the Flyback, but the present invention is not limited to the above;

Step 22: comparing the output power with a second threshold which is smaller than full load of the Flyback circuit;

Step 23: when the output power is smaller than or equal to the second threshold value, generating a judging result that the output power is low, and, in accordance with the judging result, controlling the secondary rectifier unit to be turned on twice before the primary switch is turned on; and Step 24: when the output power is greater than the second threshold value, the control apparatus generating a judging result that the output power is high, and, in accordance with the judging result, controlling the secondary rectifier unit to be turned on only once before the primary switch is turned on.

Moreover, Step 24 further comprises:

Step 241: obtaining the input voltage of the Flyback circuit;

Step 242: comparing the input voltage with a first threshold value $V_{in\_HL}$;

Step 243: when the input voltage is greater than or equal to the first threshold value $V_{in\_HL}$, generating a judging result that the input voltage is high, and, in accordance with the judging result, controlling the secondary rectifier unit to be conducting for an extended time after the current flowing through the secondary rectifier unit drops to 0; and Step 244: when the input voltage is smaller than the first threshold value $V_{in\_HL}$, the control apparatus generating a judging result that the input voltage is low, and, in accordance with the judging result, controlling the secondary rectifier unit to be turned off when the current flowing through the secondary rectifier unit drops to 0, wherein the first threshold value $V_{in\_HL} \geq nV_{out}$, $V_{out}$ is the output voltage of the Flyback circuit, and n is the turns ratio of the transformer of the Flyback circuit.

In this embodiment, the secondary rectifier unit includes a synchronous rectifier SR. In Step 241, an interelectrode voltage $V_{DS\_SR\_1}$ between the source (the first terminal) and the drain (the second terminal) of the synchronous rectifier when the primary switch is conducting is detected to obtain the input voltage $V_{in}$, $V_{in}=n(V_{DS\_SR\_1}-V_{out})$, n is the turns ratio of the transformer of the Flyback circuit, and $V_{out}$ is the output voltage of the Flyback circuit. However, the present invention is not limited to this. In another embodiment, the input voltage $V_{in}$ is obtained in Step 241 by detecting directly.

Furthermore, Step 23 comprises determining if the instantaneous value of the interelectrode voltage $V_{DS\_SR}$ between the source (the first terminal) and the drain (the second terminal) of the synchronous rectifier reaches the valley, and turning on the synchronous rectifier for a second time when the instantaneous value reaches the valley. When the interelectrode voltage $V_{DS\_SR}$ between the source (the first terminal) and the drain (the second terminal) of the synchronous rectifier reaches the $m^{th}$ valley of the waveform, the secondary controller turns on the synchronous rectifier for a second time, wherein the value of m is determined according to the load of the Flyback circuit, m is a positive integer, and wherein the larger the load is, the smaller the value of m is. In this embodiment, the magnitude of the load of the Flyback circuit can also be determined based on the magnitude of the current, wherein the current is that flowing through the synchronous rectifier or the primary switch.

Furthermore, in Step 244, the interelectrode voltage $V_{DS\_SL}$ between the drain and the source of the primary switch is detected, and the primary switch is turned on when the waveform of the interelectrode voltage $V_{DS\_SL}$ reaches the valley.

Step 23 or Step 243 further comprises detecting the interelectrode voltage $V_{DS\_SL}$ between the drain and the source of the primary switch, and turning on the primary switch when the interelectrode voltage $V_{DS\_SL}$ is smaller than a third threshold value $V_{DS\_ZVS}$, wherein the third threshold value $V_{DS\_ZVS}$ is set to be smaller than $(V_{in}-nV_{out})$, wherein $V_{in}$ is the input voltage of the Flyback circuit, n is the turns ratio of the transformer of the Flyback circuit, and $V_{out}$ is the output voltage of the Flyback circuit.

It is noteworthy that, in Step 3 or 23, a reference current $I_{ref}$ may also be formed according to the input voltage $V_{in}$ of the Flyback circuit, and the current peak value during the second conducting time of the synchronous rectifier is controlled according to the reference current $I_{ref}$ so as to control the conducting time for the second conducting time of the synchronous rectifier. The current at the second conduction can be calculated by detecting the drain-source voltage of the synchronous rectifier according to the conducting resistance thereof, or the current at the second conduction can be detected through the secondary series resistors.

Furthermore, the secondary rectifier unit includes a synchronous rectifier and a switch unit connected in parallel with the synchronous rectifier. When it is necessary to turn on the secondary rectifier unit for a second time, only the switch unit is turned on but the synchronous rectifier not. In another embodiment, the secondary rectifier unit includes a diode and a switch unit connected in parallel with the diode, wherein the switch unit is a transistor, but the invention is not limited to this.

Figure 4:
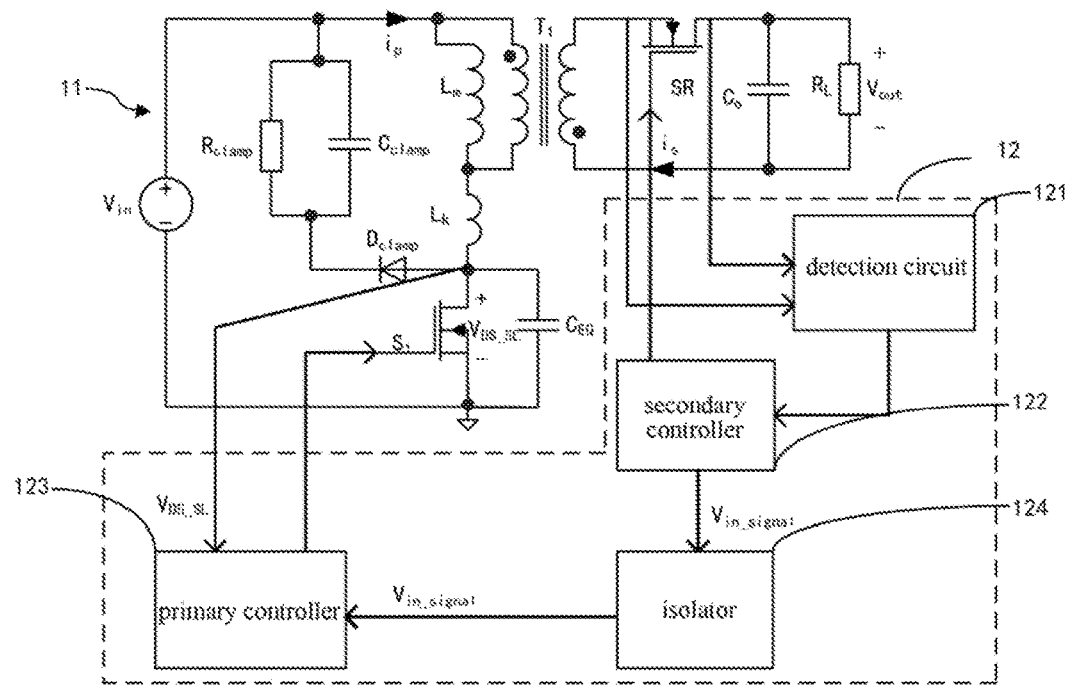
FIG. 4 is a schematic view of the structure of a control apparatus for a Flyback circuit in the first embodiment of the present invention.

Please refer to FIG. 4, which is a schematic view of the structure of a control apparatus for a Flyback circuit 11 in a first embodiment of the present invention. As shown in FIG. 4, in this embodiment, the secondary rectifier unit is a synchronous rectifier SR, and the Flyback circuit 11 includes a primary switch $S_1$ and a synchronous rectifier SR. A control apparatus 12 for the Flyback circuit is electrically connected to the primary switch $S_1$ and the synchronous rectifier SR, and the control apparatus 12 controls the synchronous rectifier SR to be turned on once or twice before the primary switch $S_1$ is turned on, to achieve ZVS of the primary switch $S_1$. The Flyback circuit 11 further comprises a transformer $T_1$ which includes a magnetizing inductor $L_m$, wherein during the second conducting time of the synchronous rectifier SR, when a reverse current flowing through the synchronous rectifier SR from the drain to the source thereof reaches a given value, the synchronous rectifier SR is turned off, and the magnetizing inductor $L_m$ and the parasitic capacitor $C_{EQ}$ of the primary switch $S_1$ resonate to achieve ZVS of the primary switch $S_1$. In this embodiment, the clamp circuit on the primary side of the Flyback circuit 11 is an RCD clamp circuit (a resistor-capacitor-diode clamp circuit), but is not limited thereto.

Further, the control apparatus 12 comprises a detection circuit 121 for detecting the input voltage $V_{in}$ of the Flyback circuit 11. The control apparatus 12 compares the input voltage with the first threshold value $V_{in\_HL}$ to generate a judging signal $V_{in\_signal}$. When the input voltage is greater than or equal to the first threshold value $V_{in\_HL}$, the control apparatus 12 generates a judging result that the input voltage $V_{in}$ is high, sets $V_{in\_signal}$ to be high, and controls the synchronous rectifier SR to be turned on twice before the primary switch $S_1$ is turned on according to the judging result, so as to achieve ZVS of the primary switch $S_1$; when the input voltage is smaller than the first threshold value $V_{in\_HL}$, the control apparatus 12 generates a judging result that the input voltage $V_{in}$ is low, sets $V_{in\_signal}$ to be low, and controls the synchronous rectifier SR to be turned on only once before the primary switch $S_1$ is turned on according to the judging result. The first threshold value $V_{in\_HL} \geq nV_{out}$, wherein $V_{out}$ is the output voltage of the Flyback circuit, and n is the turns ratio of the transformer of the Flyback circuit. In this embodiment, the detection circuit 121 is a detection circuit.

Furthermore, the detection circuit 121 detects an interelectrode voltage $V_{DS\_SR\_1}$ between the source (the first terminal) and the drain (the second terminal) of the synchronous rectifier SR during the conducting time of the primary switch $S_1$ to obtain the input voltage $V_{in}$, wherein $$V_{in} = n(V_{DS\_SR\_1} - V_{out});$$

wherein n is the turns ratio of the transformer of the Flyback circuit, and $V_{out}$ is the output voltage of the Flyback circuit. But, the present invention is not limited thereto. In another embodiment, the detection circuit may also detect the input voltage directly.

The control apparatus 12 further comprises a secondary controller 122, a primary controller 123 and an isolator 124. The secondary controller 122 is electrically connected to the synchronous rectifier SR, the detection circuit 121 and the isolator 124. The secondary controller 122 receives the input voltage through the detection circuit 121 and judges the level thereof. Then the secondary controller 122 outputs a judging result, and sets its own operating mode accordingly. The isolator 124 is electrically connected to the secondary controller 122 and the primary controller 123 for signal transmission therebetween with electrically isolating. The primary controller 123 is electrically connected to the primary switch $S_1$ and the isolator 124. The primary controller 123 sets its operating mode according to the judging result from isolator 124. The secondary controller 122 further determines if the instantaneous value of the interelectrode voltage $V_{DS\_SR}$ between the source (the first terminal) and the drain (the second terminal) of the synchronous rectifier SR reaches the valley of a waveform, and turns on the synchronous rectifier SR for a second time when the instantaneous value reaches the valley.

The secondary controller 122 further turns on the synchronous rectifier SR for a second time at the $m^{th}$ valley of the waveform of the interelectrode voltage $V_{DS\_SR}$, wherein the value of m is determined according to the load of the Flyback circuit. m is a positive integer. And the larger load leads to the smaller the value of m. In this embodiment, the magnitude of the load of the Flyback circuit can also be determined based on the magnitude of the current which is flowing through the synchronous rectifier or the primary switch.

The primary controller 123 further detects the interelectrode voltage $V_{DS\_SL}$ between the drain and the source of the primary switch $S_1$, and turns on the primary switch $S_1$ when the waveform of the interelectrode voltage $V_{DS\_SL}$ reaches the valley.

It is noteworthy that a reference current $I_{ref}$ may be formed according to the input voltage $V_{in}$ of the Flyback circuit. And the current through the synchronous rectifier during the second conduction is closed-loop controlled according to the reference current $I_{ref}$ so as to control the second conducting time of the synchronous rectifier. The current through the synchronous rectifier during the second conduction can be calculated by detecting the drain-source voltage of the synchronous rectifier according to the conducting resistance thereof, or the current through the secondary series resistors during the second conduction can be detected.

Figure 5:
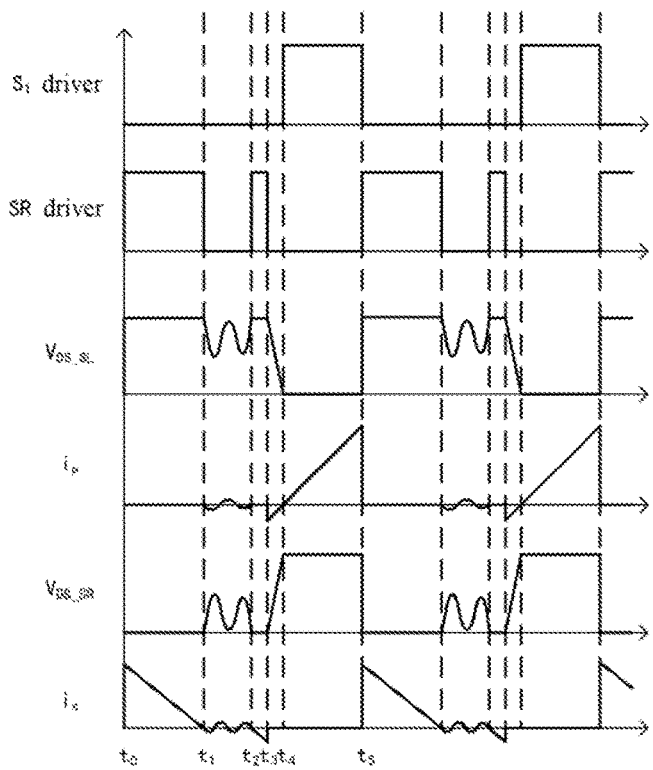
FIG. 5 is a timing diagram of the control apparatus in FIG. 4

Please refer to FIG. 5, which is a timing diagram of FIG. 4. As shown in FIG. 5:

[$t_0$~$t_1$] Stage:

At time $t_0$, the primary switch $S_1$ is turned off, the voltage $V_{DS\_SL}$ across the primary switch changes from 0V to ($V_{in}+n*V_{out}$) (wherein $V_{in}$ is the input voltage, $V_{out}$ is the output voltage, and n is turns ratio of the transformer); the current of the primary switch $S_1$ changes from the peak current $I_{pk}$ to 0 A; the synchronous rectifier is turned on, the voltage across the synchronous rectifier changes from ($V_{out}+V_{in}/n$) to 0V; the current of the synchronous rectifier SR linearly declines from the peak current, until the current of the synchronous rectifier SR is 0 A at time $t_1$.

[$t_1$~$t_2$] Stage:

At time $t_1$, the current of the synchronous rectifier SR is 0 A, and the synchronous rectifier SR is turned off. The synchronous rectifier SR, the primary switch $S_1$ and the transformer each has parasitic capacitor (equivalent to $C_{EQ}$ in FIG. 4), which will resonate with the inductor of the transformer; during the period of $t_1$~$t_2$, a resonant current flows through the parasitic capacitor of each of the primary switch $S_1$ and the synchronous rectifier SR; the resonance occurs in $V_{DS\_SL}$ with $V_{in}$ as an equilibrium point and amplitude of $nV_{out}$, thus the minimum voltage across $S_1$ may be ($V_{in}-nV_{out}$). The resonance occurs in $V_{DS\_SR}$ with $V_{out}$ as an equilibrium point and amplitude, thus the maximum voltage across SR is $2V_{out}$, and the minimum voltage is 0V, and the synchronous rectifier is turned on for a second time at time $t_2$.

[$t_2$~$t_3$] Stage:

At time $t_2$, the synchronous rectifier SR is turned on for a second time, and the voltage across the synchronous rectifier SR becomes 0V; a reverse current flows from the drain to the source of the synchronous rectifier SR; the voltage across the primary switch $S_1$ is $(V_{in}+nV_{out})$; the current flowing through the primary switch $S_1$ is 0, until the synchronous rectifier SR is turned off again at time $t_3$.

[$t_3$~$t_4$] Stage:

At time $t_3$, the synchronous rectifier SR is turned off again, and the inductor of the transformer resonate with the parasitic capacitor $C_{EQ}$ again. Due to the injection of the reverse current during the period $t_2$~$t_3$, the resonance amplitude of the $V_{DS\_SL}$ is greater than $V_{in}$, and at time $t_4$ the voltage across the primary switch $S_1$ is smaller than the third threshold $V_{DS\_ZVS}$, so that ZVS of the primary switch $S_1$ can be achieved.

[$t_4$~$t_5$] Stage:

At $t_4$, the primary switch $S_1$ is turned on, and the current flowing through the primary switch rises linearly. Until the current reaches the peak current, the primary switch is turned off. Then, repeat the previous process.

Figure 6:
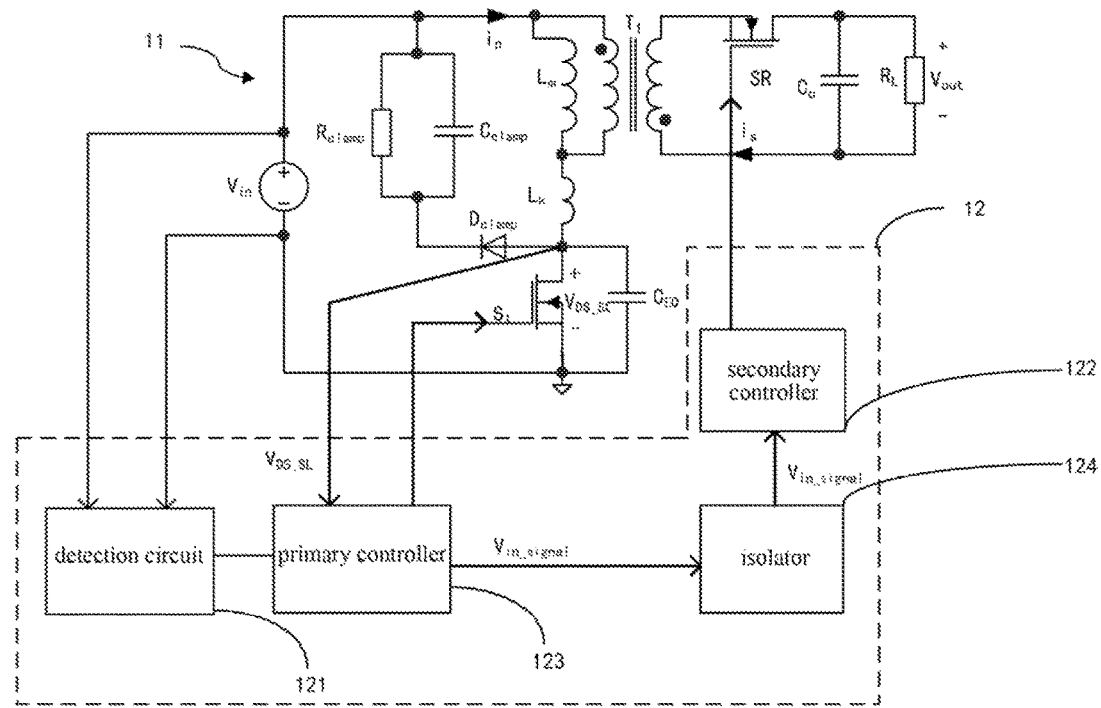
FIG. 6 is a schematic view of the structure of a control apparatus for a Flyback circuit in the second embodiment of the present invention.

Please refer to FIG. 6, which is a schematic view of the structure of a control apparatus for a Flyback circuit in a second embodiment of the present invention. In this embodiment, the detection circuit 121 detects the input voltage directly. The primary controller 123 is electrically connected to the primary switch $S_1$, the detection circuit 121 and the isolator 124. The primary controller 123 receives the input voltage through the detection circuit 121 and judges the level thereof. Then the primary controller 123 outputs a judging result, and sets its own operating mode accordingly. The isolator 124 is electrically connected to the secondary controller 122 and the primary controller 123 for signal transmission therebetween with electrically isolating. The secondary controller 122 is electrically connected to the synchronous rectifier SR and the isolator 124, and controls whether to turn on the synchronous rectifier SR for a second time according to the judging result from isolator 124.

Figure 7:
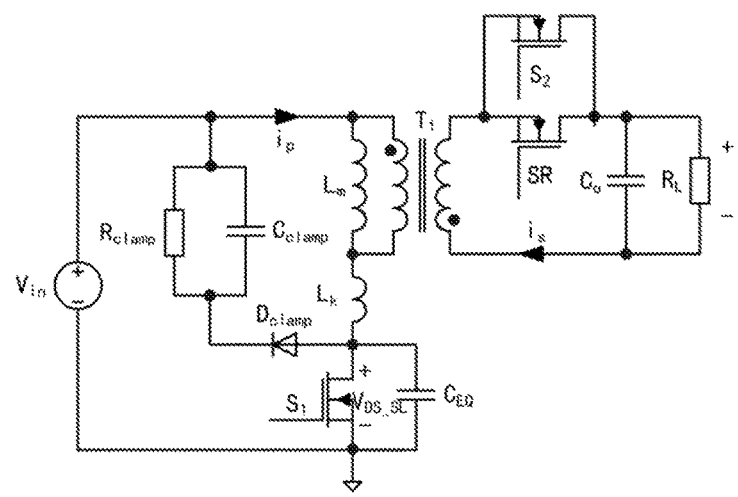
FIG. 7 is a schematic view of the structure of a control apparatus for a Flyback circuit in the third embodiment of the present invention.

Please refer to FIG. 7, which is a schematic view of the structure of a control apparatus for a Flyback circuit in a third embodiment of the present invention. The Flyback circuit further comprises a switch unit $S_2$ connected in parallel with the synchronous rectifier SR. When the secondary rectifier unit is to be turned on for a second time, only the switch unit $S_2$ is turned on but the synchronous rectifier SR not. In this embodiment, the switch unit $S_2$ is a transistor, but the present invention is not limited thereto. Since the value of the secondary reverse current needed to achieve ZVS of the primary switch is small, the parallel switch unit with a low rating current can be chosen to be turned on when the secondary rectifier unit needs to be turned on for a second time. Compared with a switch with a high rating current, a switch with a low rating current leads to smaller driving losses.

Figure 8:
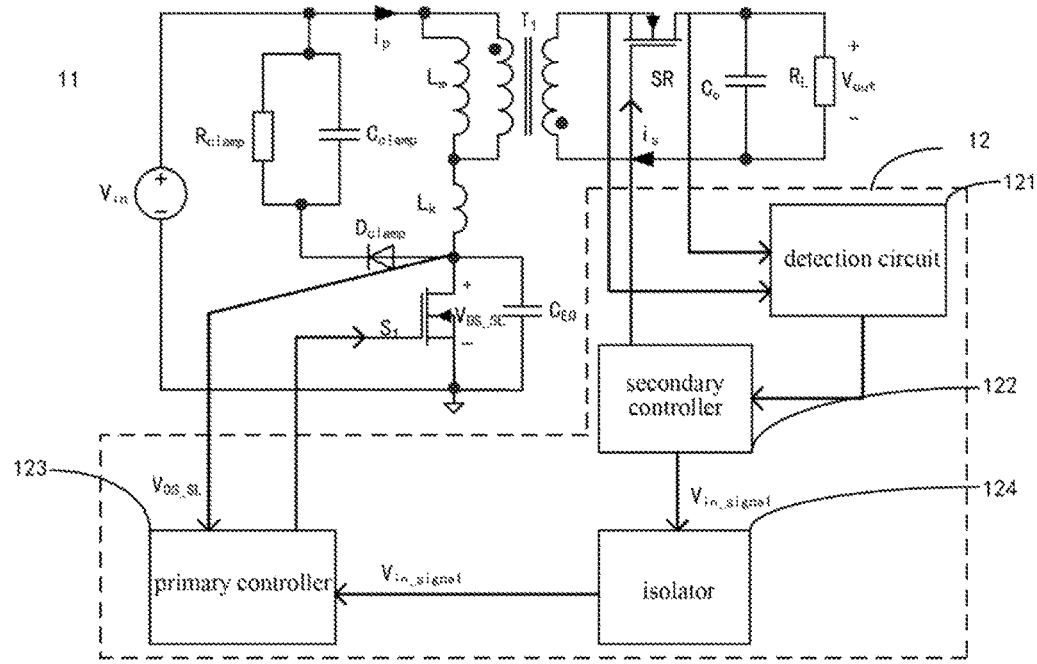
FIG. 8 is a schematic view of the structure of a control apparatus for a Flyback circuit in the fourth embodiment of the present invention.

Please refer to FIG. 8, which is a schematic view of the structure of a control apparatus for a Flyback circuit in a fourth embodiment of the present invention. The structure of the control apparatus for a Flyback circuit as shown in FIG. 8 is substantially the same as that shown in FIG. 4. The output power of the Flyback circuit can be obtained through the detection circuit 121. The control apparatus 12 compares the output power with the second threshold value. When the output power is smaller than or equal to the second threshold value, the control apparatus generates a judging result that the output power is low, and controls the secondary rectifier unit to be turned on twice before the primary switch is turned on in accordance. When the output power is greater than the second threshold value, the control apparatus generates a judging result that the output power is high, and, according to the judging result, controls the secondary rectifier unit to be turned on only once before the primary switch is turned on. The second threshold value is smaller than the full load of the Flyback circuit.

It is worth noting that the output power can be obtained by detecting the current flowing through the primary switch, or by detecting the current flowing through the secondary rectifier unit, or by detecting the output current of the Flyback, but the present invention is not limited to the above.

Further, when the output power is high, the input voltage of the Flyback circuit is obtained through the detection circuit 121, and the detection circuit 121 compares the input voltage with the first threshold value. When the input voltage is greater than or equal to the first threshold value, the control apparatus generates a judging result that the input voltage is high and controls the secondary rectifier unit to be conducting for an extended time after the current flowing through the secondary rectifier unit drops to 0. When the input voltage is smaller than the first threshold value, the control apparatus generates a judging result that the input voltage is low and controls the secondary rectifier unit to be turned off when the current flowing through the secondary rectifier unit drops to 0. The first threshold value $V_{in\_HL} \geq n \cdot V_{out}$, $V_{out}$ is the output voltage of the Flyback circuit, and n is the turns ratio of the transformer of the Flyback circuit.

The control apparatus 12 further comprises a secondary controller 122, a primary controller 123 and an isolator 124. The secondary controller 122 is electrically connected to the synchronous rectifier SR, the detection circuit 121 and the isolator 124. The secondary controller 122 receives the output power through the detection circuit 121, judges the level thereof. The secondary controller 122 receives the input voltage calculated according to the $V_{DS\_SR}$ of the secondary rectifier unit by the detection circuit 121 and judges the levels of the output power and the input voltage. Then the secondary controller 122 outputs a judging result, and sets the operating mode of its own accordingly. The isolator 124 is electrically connected to the secondary controller 122 and the primary controller 123 for signal transmission therebetween with electrically isolating. The primary controller 123 is electrically connected to the primary switch $S_1$ and the isolator 124, and sets its operating mode according to the judging result from isolator 124.

Furthermore, the primary controller 123 detects an interelectrode voltage $V_{DS\_SR}$ between the source and the drain of the primary switch $S_1$, and turns on the primary switch $S_1$ when the interelectrode voltage $V_{DS\_SL}$ is smaller than a third threshold value $V_{DS\_ZVS}$, wherein the third threshold value $V_{DS\_ZVS}$ is set to be smaller than $(V_{in}-nV_{out})$, $V_{in}$ is the input voltage of the Flyback circuit, n is the turns ratio of the transformer of the Flyback circuit, and $V_{out}$ is the output voltage of the Flyback circuit.

In another embodiment, different from the control apparatus for a Flyback circuit as shown in FIG. 8, the primary controller 123 receives the output power calculated according to the current flowing through the primary switch switch, and receives the input voltage detected directly. The primary controller judges the levels of the output power and the input voltage, outputs a judging result, and sets its own operating mode accordingly. The secondary controller also sets its operating mode according to the judging result.

Figure 9:
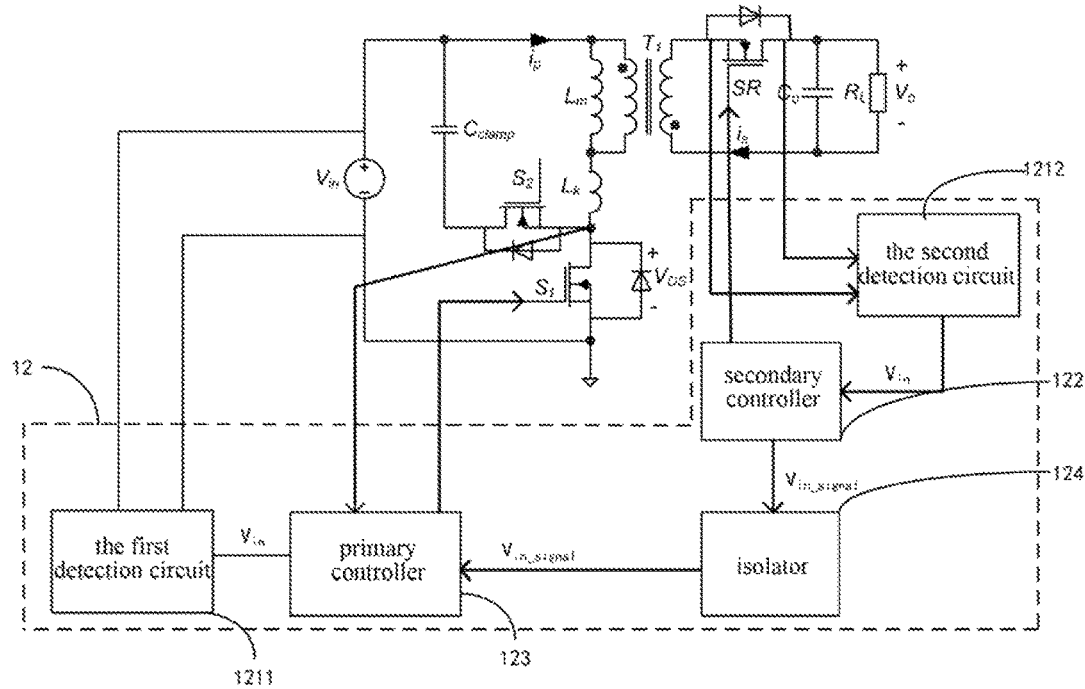
FIG. 9 is a schematic view of the structure of a control apparatus for a Flyback circuit in the fifth embodiment of the present invention.

Please refer to FIG. 9, which is a schematic view of the structure of a control apparatus for a Flyback circuit in a fifth embodiment of the present invention. In this embodiment, the clamp circuit on the primary of the Flyback circuit is an active clamp circuit, but is not limited thereto. In this embodiment, the control apparatus 12 comprises a first detection circuit 1211, a second detection circuit 1212, a secondary controller 122, a primary controller 123, and an isolator 124. The primary controller 123 is electrically connected to the primary switch $S_1$ and the first detection circuit 1211. The primary controller 123 receives the input voltage through the first detection circuit 1211, judges the level of the input voltage and outputs a voltage judging result. The secondary controller 122 is electrically connected to the synchronous rectifier SR and the second detection circuit 1212. The secondary controller 122 receives the output power calculated according to the current flowing through the synchronous rectifier SR or output current of the Flyback circuit by the second detection circuit 1212 Flyback, judges the level of the output power and outputs a power judging result. The isolator 124 is electrically connected to the secondary controller 122 and the primary controller 123, for signal transmission therebetween with electrically isolating. The primary controller 123 sets its operating mode according to the voltage judging result and the power judging result from the isolator 124, and the secondary controller 122 sets the operating mode of its according to the voltage judging result from the isolator 124 and the power judging result.

In another embodiment, different from the control apparatus shown in FIG. 9, the primary controller 123 receives the output power calculated according to the current flowing through the primary switch $S_1$ switch, judges the level of the output power and outputs a power judging result. The secondary controller 122 is electrically connected to the synchronous rectifier SR and the second detection circuit 1212. The secondary controller 122 receives the input voltage calculated according to the $V_{DS\_SR}$, judges the level of the input voltage and outputs a voltage judging result. The isolator 124 is electrically connected to the secondary controller 122 and the primary controller 123, for signal transmission therebetween with electrically isolating. The primary controller 123 sets its operating mode according to the voltage judging result from the isolator 124 and the power judging result, and the secondary controller 122 sets its operating mode according to the voltage judging result and the power judging result from the isolator.

In another embodiment, different from the principle of the control apparatus shown in FIG. 9, the primary controller 123 receives the input voltage through the first detection circuit 1211, judges the level of the input voltage and outputs a voltage judging result. The secondary controller 122 is electrically connected to the synchronous rectifier SR and the second detection circuit 1212. The secondary controller 122 receives the output power calculated according to the current flowing through the synchronous rectifier SR or output current of the Flyback circuit, judges the level of the output power and outputs a power judging result. The isolator 124 is electrically connected to the secondary controller 122 and the primary controller 123, for signal transmission therebetween with electrically isolating. The primary controller 123 sets its the operating mode according to the voltage judging result and the power judging result from the isolator 124, and the secondary controller 122 sets its operating mode according to the voltage judging result from isolator and the power judging result.

In another embodiment, different from the control apparatus shown in FIG. 9, the primary controller 123 receives the input voltage through the first detection circuit 1211 and/or the output power calculated according to the current flowing through the primary switch $S_1$, judges the level of the input voltage and/or the output power, output a first judging result, and set its own operating mode accordingly. The secondary controller 122 is electrically connected to the synchronous rectifier SR and the second detection circuit 1212, receives the input voltage calculated according to the $V_{DS\_SR}$ and/or the output power calculated according to the current flowing through the synchronous rectifier SR or output current of the Flyback circuit, judges the level of the input voltage and/or the output power, outputs a second judging result, and sets its own operating mode accordingly.

Hereinafter, the specific working process of a control apparatus for a Flyback circuit in one embodiment of the present invention will be described in detail with reference to FIG. 4: the detection circuit detects the voltage $V_{DS\_SR} = (V_{in}/n + V_{out})$ between the source and drain of the synchronous rectifier during the conducting of the primary switch to obtain an input voltage. The secondary controller receives the input voltage and judges the level of the input voltage. When $V_{DS\_SR} >= 2V_{out}$, the valley switching cannot achieve ZVS of the primary switch, so a first threshold value $V_{in\_HL} = 2V_{out}$ may be set in the secondary controller; when $V_{DS\_SR} >= V_{in\_HL}$, the secondary controller judges that the input voltage is high; when $V_{DS\_SR} < V_{in\_HL}$, the secondary controller judges that the input voltage is low; the judging result is transmitted to the primary controller via the isolator, and the operating mode of the primary switch is determined accordingly. Because the input voltage does not change rapidly, the isolator may be low-speed devices such as optocoupler, isolating transformer, or the like, but is not limited to those.

The primary controller determines the operating mode of the primary switch by means of the judging result: when judging result is low, this means that the input voltage is low, and the operating mode of the primary switch is normal mode, i.e., the voltage between the drain and the source of the primary switch is detected, and the primary switch is turned on when the voltage between the drain and the source reaches a valley; when judging result is high, this means that the input voltage is high, and its operating mode is second conduction mode, i.e., the primary switch is turned on when the voltage between the drain and the source of the primary switch is smaller than the third threshold value $V_{DS\_ZVS}$. The third threshold value $V_{DS\_ZVS}$ can be set within a range between 5V and 15V. In accordance with the working principle of the circuit, it is clear that when the judging result is high, the voltage between the drain and the source of the primary switch keeps greater than $V_{DS\_ZVS}$ before the second conduction of the synchronous rectifier; after the second conduction of the synchronous rectifier, the voltage between the drain and the source of the primary switch falls below $V_{DS\_ZVS}$, the primary switch is turned on when the primary controller detects that the voltage $V_{DS\_SL}$ between the drain and the source of the primary switch is smaller than the third threshold value $V_{DS\_ZVS}$, so as to achieve ZVS.

Figure 10:
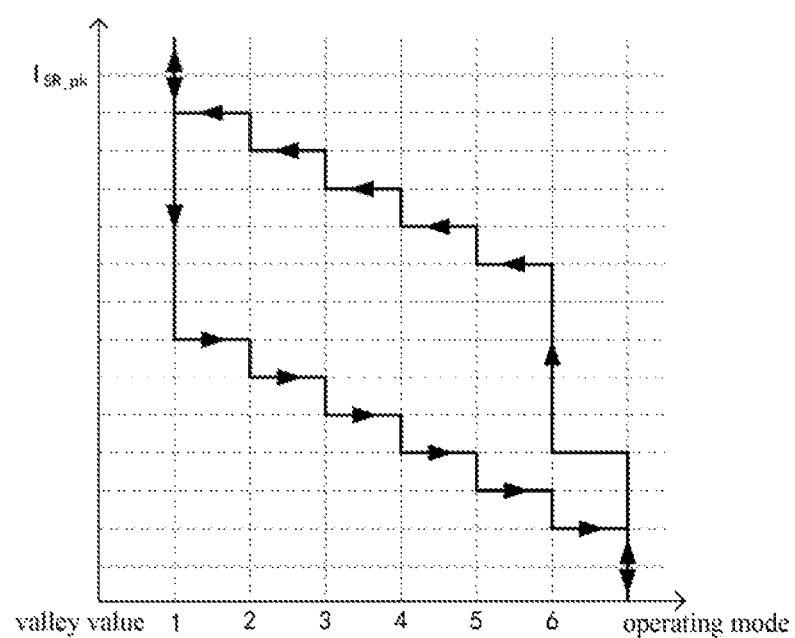
FIG. 10 is a schematic diagram of the relationship between the peak current of a synchronous rectifier and the valley at which the synchronous rectifier turns on for a second time.

Please refer to FIGS. 5 and 10 again. FIG. 10 is a schematic diagram of the relationship between the peak current of a synchronous rectifier and the valley at which the synchronous rectifier turned on for a second time. The second conducting time of the synchronous rectifier may have significant impacts on the circuit efficiency, mainly in two aspects:

(1) The second time turn-on moment of the synchronous rectifier has a significant impact on the switching losses of the synchronous rectifier. By controlling the second time turn-on moment of the synchronous rectifier, the ZVS of the synchronous rectifier can be achieved, thereby reducing the switching losses, as shown in FIG. 5. After the synchronous rectifier being turned on once and the current of the secondary windings declines to zero, the voltage between the source and the drain of the synchronous rectifier starts resonance, with a peak value of 2 times $V_{out}$ and a valley value of 0V. Therefore, ZVS can be achieved by turning on the synchronous rectifier for a second time at the valley.

(2) The second time turn-on moment of the synchronous rectifier will affect the switching frequency, thereby imposing a greater impact on the efficiency of the circuit at light load. As the load changes, the second time turn-on moment of the synchronous rectifier is chosen to be the $m^{th}$ valley by secondary controller, wherein m is a positive integer, so that the switching frequency can be controlled to be kept within a reasonable range, whereby the light load efficiency can be increased. The magnitude of the load can be determined in two ways: in a preferred embodiment, it can be determined by the magnitude of $I_{SR\_pk}$ which is the peak current of the synchronous rectifier SR, and the relationship between the magnitude of $I_{SR\_pk}$ and the valley at which the synchronous rectifier switch on for a second time is shown in FIG. 10. In another embodiment, the magnitude of the load is determined by judging the peak current flowing through the primary switch, and the judging result is transmitted to the secondary controller via the isolator.

The control method and the control apparatus for a Flyback circuit according to the present invention have the following advantages:

1. achieving ZVS of the primary switch under the entire input voltage range and the entire load range without adding additional power devices; and 2. not only achieving ZVS of the primary switch, but also increasing the light load efficiency and reducing the loss caused by the corresponding control strategy.

It is to be noted that the above embodiments are only used to illustrate the present invention but not to limit the technical solution described in the present invention; moreover, although the present invention is described in detail with reference to the above embodiments in this specification, the ordinary persons skilled in the art should understand that changes or equivalent substitutions can still be made to the present invention; thus, all the technical solutions not departing from the spirit and scope of the present invention and the improvements thereof should be covered by the protection scope of the appended claims of the present invention.

What is claimed is:

1. A control method for a Flyback circuit, the Flyback circuit including a primary switch, a secondary rectifier unit, a transformer and an output capacitor, wherein the secondary rectifier unit includes a first terminal and a second terminal, which are electrically connected to the transformer and the output capacitor, respectively, characterized by turning on the primary switch after the secondary rectifier unit is controlled to be turned on once or twice according to an input voltage or according to the input voltage and an output power of the Flyback, to achieve a zero-voltage-switching of the primary switch.

2. The control method according to claim 1, characterized by further comprising the following steps: comparing the input voltage of the Flyback circuit with a first threshold value; when the input voltage is greater than or equal to the first threshold value, generating a judging result that the input voltage is high; and, according to the judging result, controlling the secondary rectifier unit to be turned on twice before the primary switch is turned on.

3. The control method according to claim 2, characterized in that when the input voltage is smaller than the first threshold value, the control apparatus generates a judging result that the input voltage is low, and, according to the judging result, controls the secondary rectifier unit to be turned on only once before the primary switch is turned on.

4. The control method according to claim 2, characterized in that the first threshold value $V_{in\_HL} \geq nV_{out}$, wherein $V_{out}$ is the output voltage of the Flyback circuit, and n is a turns ratio of the transformer of the Flyback circuit.

5. The control method according to claim 2, characterized in that an interelectrode voltage $V_{DS\_SR\_1}$ between the first terminal and the second terminal of the secondary rectifier unit during the conducting time of the primary switch is detected to obtain the input voltage $V_{in}$, wherein $$V_{in}=n(V_{DS\_SR\_1}-V_{out});$$

wherein n is a turns ratio of the transformer of the Flyback circuit, and $V_{out}$ is the output voltage of the Flyback circuit.

6. The control method according to claim 2, characterized in that the input voltage is detected directly.

7. The control method according to claim 1, characterized by further comprising the following steps: comparing the output power of the Flyback circuit with a second threshold value; when the output power is smaller than or equal to the second threshold value, generating a judging result that the output power is low; and, according to the judging result, controlling the secondary rectifier unit to be turned on twice before the primary switch is turned on.

8. The control method according to claim 7, characterized in that when the output power is greater than the second threshold value, the control apparatus generates a judging result that the output power is high, and, according to the judging result, controls the secondary rectifier unit to be turned on only once before the primary switch is turned on,
compares the input voltage of the Flyback circuit with the first threshold value when the output power is high, and
when the input voltage is greater than or equal to the first threshold value, generates a judging result that the input voltage is high, and, according to the judging result, controls the secondary rectifier unit to be conducting for an extended time after the current flowing through the secondary rectifier unit drops to 0, and
when the input voltage is smaller than the first threshold value, generates a judging result that the input voltage is low, and, according to the judging result, controlling the secondary rectifier unit to be turned off when the current flowing through the secondary rectifier unit drops to 0.

9. The control method according to claim 7, characterized in that the output power is obtained by detecting the current flowing through the primary switch, or by detecting the current flowing through the secondary rectifier unit, or by detecting the output current of the Flyback circuit.

10. The control method according to claim 1, characterized in that the transformer includes a magnetizing inductor, and that the secondary rectifier unit includes a synchronous rectifier, wherein during the second conducting time of the secondary rectifier unit, when a reverse current flowing through the synchronous rectifier from a drain to a source thereof reaches a given value, the synchronous rectifier is turned off, and the magnetizing inductor resonate with a parasitic capacitor of the primary switch to achieve the zero-voltage-switching of the primary switch.

11. The control method according to claim 1, characterized by further comprising the following steps: further determining if the instantaneous value of the interelectrode voltage between the first terminal and the second terminal of the secondary rectifier unit reaches the m$^{th}$ valley of a waveform, and turning on the secondary rectifier unit for a second time when the instantaneous value of the interelectrode voltage between the first terminal and the second terminal of the secondary rectifier unit reaches the m$^{th}$ valley of the waveform, wherein the value of m is determined according to the load of the Flyback circuit, and m is a positive integer, and wherein the larger load leads to the smaller value of m.

12. The control method according to claim 1, characterized by detecting an interelectrode voltage $V_{DS\_SL}$ between the drain and the source of the primary switch, and turning on the primary switch when the interelectrode voltage $V_{DS\_SL}$ is smaller than a third threshold value, wherein the third threshold value is set to be smaller than $(V_{in}-nV_{out})$, wherein $V_{in}$ is the input voltage of the Flyback circuit, n is a turns ratio of the transformer of the Flyback circuit, and $V_{out}$ is an output voltage of the Flyback circuit.

13. The control method according to claim 1, characterized in that the secondary rectifier unit includes a synchronous rectifier or a diode and a switch unit connected in parallel with the synchronous rectifier, and that when the secondary rectifier unit is to be turned on for a second time, only the switch unit is turned on.

14. The control method according to claim 1, characterized by forming a reference current according to the input voltage of the Flyback circuit, and controlling a current peak value during the second conducting time of the secondary rectifier unit according to the reference current so as to control the second conducting time of the secondary rectifier unit.

15. The control method according to claim 1, characterized in that the Flyback circuit includes an RCD clamp circuit or an active clamp circuit.

16. A control apparatus for a Flyback circuit, the Flyback circuit including a primary switch, a secondary rectifier unit, a transformer and an output capacitor, wherein the secondary rectifier unit includes a first terminal and a second terminal, which are electrically connected to the transformer and the output capacitor, respectively, characterized in that the control apparatus is electrically connected to the primary switch and the secondary rectifier unit, and that the primary switch is turned on after the secondary rectifier unit is controlled to be turned on once or twice according to an input voltage, or according to the input voltage and an output power of the Flyback, to achieve zero-voltage-switching of the primary switch.

17. The control apparatus according to claim 16, characterized in that the control apparatus further comprises at least one detection circuit for detecting the input voltage of the Flyback circuit, that the control apparatus compares the input voltage with a first threshold value and generates a judging result that the input voltage is high when the input voltage is greater than or equal to the first threshold value, and that the control apparatus controls the secondary rectifier unit to be turned on twice before the primary switch is turned on according to the judging result.

18. The control apparatus according to claim 17, characterized in that when the input voltage is smaller than the first threshold value, the control apparatus generates a judging result that the input voltage is low, and, according to the judging result, controls the secondary rectifier unit to be turned on only once before the primary switch is turned on.

19. The control apparatus according to claim 17, characterized in that the first threshold value $V_{in\_HL} \geq nV_{out}$, wherein $V_{out}$ is the output voltage of the Flyback circuit, and n is a turns ratio of the transformer of the Flyback circuit.

20. The control apparatus according to claim 17, characterized in that the detection circuit detects an interelectrode voltage $V_{DS\_SR\_1}$ between the first terminal and the second terminal of the secondary rectifier unit during the conducting time of the primary switch to obtain the input voltage $V_{in}$, wherein $V_{in}=n(V_{DS\_SR\_1}-V_{out})$;

wherein n is a turns ratio of the transformer of the Flyback circuit, and $V_{out}$ is the output voltage of the Flyback circuit.

21. The control apparatus according to claim 17, characterized in that the detection circuit detects an input voltage on the primary directly.

22. The control apparatus according to claim 16, characterized in that the control apparatus further comprises at least one detection circuit for detecting the output power of the Flyback circuit, that the control apparatus compares the output power with a second threshold value and generates a judging result that the output power is low when the output power is smaller than or equal to the second threshold value, and that the control apparatus controls the secondary rectifier unit to be turned on twice before the primary switch is turned on according to the judging result.

23. The control apparatus according to claim 22, characterized in that when the output power is greater than the second threshold value, the control apparatus generates a judging result that the output power is high, and, according to the judging result, controls the secondary rectifier unit to be turned on only once before the primary switch is turned on;

when the output power is high, the detection circuit further detects the input voltage of the Flyback circuit, compares the input voltage of the Flyback circuit with the first threshold value, generates a judging result that the input voltage is high when the input voltage is greater than or equal to the first threshold value, and, according to the judging result, controls the secondary rectifier unit to be conducting for an extended time after the current flowing through the secondary rectifier unit drops to 0;

when the output power is high and the input voltage is smaller than the first threshold value, the control apparatus generates a judging result that the input voltage is low and, according to the judging result, controls the secondary rectifier unit to be turned off when the current flowing through the secondary rectifier unit drops to 0.

24. The control apparatus according to claim 22, characterized in that the at least one detection circuit detects the current flowing through the primary switch, the current flowing through the secondary rectifier unit, or the output current of the Flyback circuit to obtain the output power.

25. The control apparatus according to claim 16, characterized in that the transformer includes a magnetizing inductor, and that the secondary rectifier unit includes a synchronous rectifier, wherein during the second conducting time of the secondary rectifier unit, when a reverse current flowing through the synchronous rectifier from a drain to a source thereof reaches a given value, the synchronous rectifier is turned off, and the magnetizing inductor resonate with a parasitic capacitor of the primary switch to achieve the zero-voltage-switching of the primary switch.

26. The control apparatus according to claim 16, characterized in that the control apparatus comprises:

a secondary controller electrically connected to the secondary rectifier unit and the detection circuit, the secondary controller receiving the input voltage calculated according to the interelectrode voltage between the first terminal and the second terminal of the secondary rectifier unit by the detection circuit, judging the level of the input voltage, outputting a judging result, and setting its own operating mode accordingly, or receiving the output power calculated according to the current flowing through the secondary rectifier unit or output current of the Flyback circuit by the detection circuit, receiving the input voltage calculated according to the interelectrode voltage between the first terminal and the second terminal of the secondary rectifier unit by the detection circuit, judging the levels of the output power and the input voltage, outputting a judging result, and setting its own operating mode accordingly;

an isolator electrically connected to the secondary controller and the primary controller, for signal transmission between the secondary controller and the primary controller; and a primary controller electrically connected to the primary switch, the primary controller setting the its operating mode according to the judging result.

27. The control apparatus according to claim 16, characterized in that the control apparatus comprises:

a primary controller electrically connected to the primary switch and the detection circuit, for receiving the input voltage through the detection circuit, judging the level of the input voltage, outputting a judging result, and setting its own operating mode accordingly, or receiving the output power calculated according to the current flowing through the primary switch by the detection circuit, receiving the input voltage through the detection circuit, judging the levels of the output power and the input voltage, outputting a judging result, and setting its own operating mode accordingly;

an isolator electrically connected to the secondary controller and the primary controller, for signal transmission between the secondary controller and the primary controller; and a secondary controller electrically connected to the secondary rectifier unit, the secondary controller setting its operating mode according to the judging result from the isolator.

28. The control apparatus according to claim 16, characterized in that the control apparatus comprises:

a first detection circuit and a second detection circuit;

a primary controller electrically connected to the primary switch and the first detection circuit, for receiving the input voltage through the first detection circuit, judging the level of the input voltage and outputting a voltage judging result;

a secondary controller electrically connected to the secondary rectifier unit and the second detecting circuit, the secondary controller receiving the output power calculated according to the current flowing through the secondary rectifier unit or output current of the Flyback circuit by the second detection circuit, judging the level of the output power and outputting a power judging result, and an isolator electrically connected to the secondary controller and the primary controller, for signal transmission therebetween;

wherein the primary controller sets its operating mode according to the voltage judging result and the power judging result, and the secondary controller sets its operating mode according to the voltage judging result and the power judging result.

29. The control apparatus according to claim 16, characterized in that the control apparatus includes a secondary controller which further determines if an instantaneous value of the interelectrode voltage between the first terminal and the second terminal of the secondary rectifier unit reaches the $m^{th}$ valley of a waveform, and turns on the secondary rectifier unit for a second time when the instantaneous value of the interelectrode voltage between the first terminal and the second terminal of the secondary rectifier unit reaches the $m^{th}$ valley of the waveform, wherein the value of m is determined according to the load of the Flyback circuit, and m is a positive integer, and wherein the larger load leads to the smaller value of m.

30. The control apparatus according to claim 16, characterized in that the control apparatus includes a primary controller, which detects the interelectrode voltage between the drain and the source of the primary switch, and turns on the primary switch when the interelectrode voltage $V_{DS\_SL}$ is smaller than a third threshold value, wherein the third threshold value is set to be smaller than $(V_{in}-nV_{out})$, wherein $V_{in}$ is the input voltage of the Flyback circuit, n is the turns ratio of of the transformer of the Flyback circuit, and $V_{out}$ is the output voltage of the Flyback circuit.

31. The control apparatus according to claim 16, characterized in that the secondary rectifier unit includes a synchronous rectifier or a diode, and a switch unit connected in parallel with the synchronous rectifier, and that when the secondary rectifier unit is to be turned on for a second time, only the switch unit is turned on.

32. The control apparatus according to claim 16, characterized in that the control apparatus forms a reference current according to an input voltage of the Flyback circuit, and controls a current peak value during the second conducting time of the secondary rectifier unit according to the reference current so as to control the conducting time of the secondary rectifier unit.

33. The control apparatus according to claim 16, characterized in that the Flyback circuit includes an RCD clamp circuit or an active clamp circuit.

* * * * *